United States Patent
Letko et al.

(10) Patent No.: US 11,225,550 B2
(45) Date of Patent: Jan. 18, 2022

(54) POLYURETHANE PRODUCT WITH SULFUR-CONTAINING POLYESTER POLYOL

(71) Applicant: Dow Global Technologies LLC, Midland, MI (US)

(72) Inventors: Christopher S. Letko, Lake Jackson, TX (US); Harshad M. Shah, Lake Jackson, TX (US); Rajat Duggal, Pearland, TX (US); Nathan Wilmot, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 323 days.

(21) Appl. No.: 16/462,666

(22) PCT Filed: Dec. 11, 2017

(86) PCT No.: PCT/US2017/065545
§ 371 (c)(1),
(2) Date: May 21, 2019

(87) PCT Pub. No.: WO2018/111750
PCT Pub. Date: Jun. 21, 2018

(65) Prior Publication Data
US 2021/0277178 A1 Sep. 9, 2021

Related U.S. Application Data

(60) Provisional application No. 62/434,467, filed on Dec. 15, 2016.

(51) Int. Cl.
| | |
|---|---|
| *C08G 18/16* | (2006.01) |
| *C08G 63/64* | (2006.01) |
| *C08G 63/688* | (2006.01) |
| *C08G 18/09* | (2006.01) |
| *C08G 18/22* | (2006.01) |
| *C08G 18/46* | (2006.01) |
| *C08G 18/76* | (2006.01) |
| *C08J 9/00* | (2006.01) |
| *C08J 9/14* | (2006.01) |

(52) U.S. Cl.
CPC ....... *C08G 63/6886* (2013.01); *C08G 18/092* (2013.01); *C08G 18/163* (2013.01); *C08G 18/225* (2013.01); *C08G 18/4676* (2013.01); *C08G 18/7671* (2013.01); *C08J 9/0023* (2013.01); *C08J 9/0038* (2013.01); *C08J 9/0061* (2013.01); *C08J 9/141* (2013.01); *C08G 2110/005* (2021.01); *C08G 2110/0025* (2021.01); *C08G 2115/02* (2021.01); *C08J 2203/14* (2013.01); *C08J 2205/052* (2013.01); *C08J 2205/10* (2013.01); *C08J 2375/06* (2013.01); *C08J 2483/12* (2013.01)

(58) Field of Classification Search
CPC .............. C08G 63/6886; C08G 18/092; C08G 18/7671; C08G 18/4676; C08G 18/163; C08G 18/225; C08G 2115/02; C08G 2110/005; C08G 2110/025; C08J 9/0023; C08J 9/0061; C08J 9/141; C08J 9/0038; C08J 2375/06; C08J 2203/14; C08J 2205/052; C08J 2205/10; C08J 2483/12
See application file for complete search history.

(56) References Cited

U.S. PATENT DOCUMENTS

| | | | |
|---|---|---|---|
| 3,158,663 A | 11/1964 | von Brachel et al. | |
| 3,933,694 A | 1/1976 | Wysocki | |
| 4,353,995 A * | 10/1982 | Szabat .................. | C08G 18/225 521/125 |
| 4,536,522 A * | 8/1985 | Grigsby, Jr. ........ | C08G 18/3868 252/182.17 |
| 5,561,103 A | 10/1996 | Tipton | |
| 7,087,708 B2 | 8/2006 | Rappoport et al. | |
| 2003/0083394 A1* | 5/2003 | Clatty .................... | C08G 18/36 521/155 |
| 2016/0303778 A1 | 10/2016 | Bertucelli et al. | |
| 2016/0347909 A1 | 12/2016 | Chang | |

FOREIGN PATENT DOCUMENTS

| | | | |
|---|---|---|---|
| GB | 907647 | 10/1962 | |
| GB | 1502906 | * 3/1978 | ............. C08G 63/00 |

\* cited by examiner

*Primary Examiner* — Kara B Boyle

(57) ABSTRACT

A reaction system for forming a step-growth polymerized sulfur-containing polyester polyol includes at least one sulfur-containing component selected from the group of a sulfur-containing polyol or a sulfur-containing polycarboxylic acid, an amount of the at least one sulfur-containing component being from 1 wt % to 60 wt %, at least one aromatic component selected from the group of an aromatic multi-functional ester, an aromatic multi-functional carboxylic acid, and an aromatic anhydride, an amount of the at least one aromatic component being from 1 wt % to 60 wt %, at least one simple polyol that excludes sulfur and is different from the sulfur containing polyol, an amount of the at least one simple polyol being from 0 wt % to 60 wt %, and at least one polymerization catalyst. The reaction system for forming the sulfur-containing polyester polyol has a sulfur content that is from 2 wt % to 20 wt %.

9 Claims, No Drawings

POLYURETHANE PRODUCT WITH SULFUR-CONTAINING POLYESTER POLYOL

FIELD

Embodiments relate to polyurethane based products prepared using a sulfur-containing polyester polyol and method of manufacturing such polyurethane based products.

INTRODUCTION

Polyurethane based products that have fire resistant properties are desirable for the industrial, comfort, clothing, and energy efficiency applications. It is a continuous desire and challenge to improve the fire resistance properties, e.g., in instances where the polyurethane product is prepared using aromatic isocyanates. Further, it is a continuous desire to replace halogenated fire retardant agents in rigid foam systems with halogen-free species that are capable of being reacted into a polymer network. In this regard, most fire retardant additives that are not covalently incorporated into a polymer network may leach out from a final product. Halogenated fire retardant agents such as organophosphate additives are believed to cause potentially cause toxicity concerns and the use of such is increasingly being regulated. Accordingly, alternatives are sought.

SUMMARY

Embodiments may be realized by providing a reaction system for forming a step-growth polymerized sulfur-containing polyester polyol, the reaction system include at least one sulfur-containing component selected from the group of a sulfur-containing polyol or a sulfur-containing polycarboxylic acid, an amount of the at least one sulfur-containing component being from 1 wt % to 60 wt %, based on a total weight of the reaction system; at least one aromatic component selected from the group of an aromatic multi-functional ester, an aromatic multi-functional carboxylic acid, and an aromatic anhydride, an amount of the at least one aromatic component being from 1 wt % to 60 wt %, based on the total weight of the reaction system; at least one simple polyol that excludes sulfur and is different from the sulfur containing polyol, an amount of the at least one simple polyol being from 0 wt % to 60 wt %, based on a total weight of the reaction system; and at least one polymerization catalyst. The reaction system for forming the sulfur-containing polyester polyol having a sulfur content that is from 2 wt % to 20 wt %, based on a total weight of the reaction system.

DETAILED DESCRIPTION

Polyurethane products, such as polyurethane and/or polyisocyanurate rigid foams, may be prepared using a reaction system that includes an isocyanate component and an isocyanate-reactive component. In particular, the polyurethane product is formed as the reaction product of the isocyanate component and the isocyanate-reactive component. The isocyanate component includes at least one isocyanate such as an isocyanate-terminated prepolymer and/or a polyisocyanate (e.g., an aromatic polyisocyanate). The isocyanate-reactive component includes at least one compound having an isocyanate reactive hydrogen atom group, such as a hydroxyl group and/or an amine group. For example, the isocyanate-reactive component may include a polyester polyol, a polyether polyol, or combinations thereof. The isocyanate component and/or the isocyanate-reactive component may include additives, such as those known in the art.

Use of aromatic polyester polyols in polyurethane and/or polyisocyanurate rigid foams (also referred to PUR/PIR foams) is believed to increase fire behavior (such as flame retardant) properties. With respect to the exemplary embodiments, the use of a thioether-functionalized polyester polyol may even further improve fire behavior. Further, use of the thioether-functionalized polyester polyol may avoid and/or reduce the use of polyalkylene glycol monomers and/or aromatic carboxylic acids, which components may contribute to thermo-oxidative instability. Also, the thioether functionality into the foam network may essentially add an antioxidant unit in the resulting PUR/PIR foams.

According to embodiments, the isocyanate-reactive component includes at least two components. In particular, the isocyanate-reactive component includes a polyol component and an additive component. According to exemplary embodiments, the polyol component includes one or more sulfur-containing polyester polyols, and may optionally include one or more other polyols such as one or more polyether polyols and/or one or more polyester polyols. In exemplary embodiments, the isocyanate-reactive component may optionally include a sulfur containing monomer, and the sulfur containing monomer may replace at least part of the sulfur containing polyester polyol. A level of sulfur in the polyurethane product prepared using the sulfur-containing polyester polyols and optionally sulfur-containing monomers may be at least 0.1 wt %, based on a total weight of the polyurethane product. For example, the level of sulfur may be up to 3.0 wt %, based on a total weight of the polyurethane product. For example, the amount of sulfur in a composition for forming the polyurethane product may be from 0.1 wt % to 3.0 wt % (e.g., from 0.5 wt % to 3.0 wt %, from 0.5 wt % to 2.5 wt %, from 0.5 wt % to 2.0 wt %, from 0.5 wt % to 1.5 wt %, from 1.0 wt % to 1.5 wt %, etc.), based on a total weight of the composition.

It is desirable to identify sulfur-containing polyester polyols, which are usable as a component of the isocyanate-reactive component, that offer fire resistant properties and optionally ultra-violet (UV) light stability. The sulfur-containing polyester polyols may be utilized with various blowing agents, such as water, hydrocarbons, chlorofluorocarbons, hydrofluoroolefins, and hydrochlorofluoroolefins.

In exemplary embodiments, the one or more sulfur-containing polyester polyols may be present in an amount from 1 wt % to 99 wt % (e.g., 10 wt % to 95 wt %, 15 wt % to 90 wt %, 25 wt % to 90 wt %, 35 wt % to 85 wt %, 45 wt % to 85 wt %, 50 wt % to 80 wt %, 55 wt % to 75 wt %, 60 wt % to 75 wt %, 65 wt % to 75 wt %, etc.) based on the total weight of the isocyanate-reactive component. The other polyols, other than one or more sulfur-containing polyester polyols, may account for 0 wt % to 99 wt %, of the total weight of the isocyanate-reactive component. For example, other polyols, if present, may be a minority component in the reaction system for forming the polyurethane based product, while the sulfur-containing polyester polyol is a majority component. The additive component may include additives known in the art for use in preparing polyurethane based products. Exemplary additives include a catalyst, a curing agent, a surfactant, a blowing agent, water, a flame retardant, and/or a filler. The additive component may account for 0.1 wt % to 60.0 wt % (e.g., 1 wt % to 55 wt %, 10 wt % to 55 wt %, 15 wt % to 50 wt %, 20 wt % to 45 wt %, 25 wt % to 40 wt %, 25 wt % to 35 wt %, etc.), based on the total weight of the isocyanate-reactive component.

Sulfur-Containing Polyester Polyol

The one or more sulfur-containing polyester polyols may each have a nominal hydroxyl number from 2 to 8 (e.g., hydroxyl functionality and number of hydroxyl groups). The sulfur-containing polyester polyol may be a liquid at room temperature and/or may be incorporated into a carrier polyol to form a liquid at room temperature. The sulfur-containing polyester polyol may not be a dispersion with a liquid phase and a solid phase. The sulfur-containing polyester polyols may be in liquid form when introduced into the reaction system for forming the polyurethane product (e.g., in exemplary embodiments without the use of a diluent or carrier polyol). The sulfur-containing polyester polyol may have a number average molecular weight from 400 g/mol to 10,000 g/mol (e.g., 400 g/mol to 6,000 g/mol, 400 g/mol to 5,000 g/mol, 400 g/mol to 4,000 g/mol, 400 g/mol to 3,000 g/mol, 400 g/mol to 2,000 g/mol, 400 g/mol to 1,500 g/mol, 500 g/mol to 1,000 g/mol, etc.)

A composition for forming the sulfur-containing polyester polyol has a sulfur content that is from 2 wt % to 20 wt % (e.g., 2 wt % to 18 wt %, 4 wt % to 17 wt %, 5 wt % to 16 wt %, etc.), based on a total weight of the composition for forming the polyester polyol. The sulfur-containing polyester polyol may have a sulfur content that is from 2 wt % to 20 wt % (e.g., 2 wt % to 18 wt %, 4 wt % to 17 wt %, 5 wt % to 16 wt %, etc.), based on a total weight of the polyester polyol. The sulfur-containing polyester polyol may have a sulfur-containing polyol content (e.g., thiodiglycol content) that is from 5 mol % to 99 mol % (e.g., 5 mol % to 80 mol %, 10 mol % to 70 mol %, 20 mol % to 60 mol %, 25 mol % to 55 mol %, etc.) The sulfur-containing polyester polyol may have a viscosity that equal to or less than 750 Pa·s at 25° C. (e.g., equal to or less than 50 Pa·s at 25° C.). For example, the viscosity may be less than 50,000 cP at 25° C. The viscosity may be from 1,000 cP to 45,000 cP, at 25° C., from 2,000 cP to 35,000 cP, at 25° C., from 3,000 cP to 25,000 cP, at 25° C., from 5,000 cP to 20,000 cP, at 25° C., from 5,000 cP to 15,000 cP, at 25° C., etc.

The sulfur-containing polyester polyol may be formed by utilizing a step-growth polymerization process, in which a reaction system includes (i) at least one sulfur-containing component selected from the group of a sulfur-containing polyol and sulfur-containing polycarboxylic acid (ii) at least one aromatic component selected from the group of an aromatic multi-functional ester (such as a diester), an aromatic multifunctional acid (such as a dicarboxylic acid), and an aromatic anhydride (iii) optionally at least one simple polyol (e.g., that excludes sulfur so as to be different from the sulfur-containing polyol), and (iv) a polymerization catalyst. The reaction system forms long chain polyester polyols in which the terminal ends of the polymeric chain remain active (as opposed to chain-growth polymerization). The sulfur-containing polyester polyol, according to exemplary embodiments, is prepared using at least a sulfur-containing polyol to form repeating units thereof (e.g., may be a step-growth polymerized sulfur-containing monomer).

The sulfur-containing component (such as the sulfur-containing polyol) may not necessarily act as an initiator, and may instead be part of a mixture of monomers used to for the polyester polyol. The growth of the polymer chain for the sulfur-containing polyester polyol may be from points throughout the matrix of the polymer chain, in other words polymer growth may not be limited to one or both terminal ends of the polymer chain. Accordingly, in exemplary embodiments, growth of the polymer chain may occur with respect to at least one point in the middle of polymer chain and optionally at one or both terminal ends of the polymer chain. The sulfur-containing polyester polyol may be prepared at temperatures ranging from 100° C. to 250° C., e.g., using a polymerization catalyst (e.g., an organic titanate catalyst may be used). The temperature used may be varied during the process, e.g., including increasing the temperature and decreasing the temperature to further the polymerization reaction. The process for forming the sulfur-containing polyester polyol may be prepared in a process that utilizes an azeotrope solvent, as is known art for polyester polyols. The sulfur-containing polyester polyol may be further differentiated from polyethers prepared by a transesterification process, e.g., by the substitution of a polyhydric alcohol with the sulfur-containing polyol, to form a polyester polyol and glycol (such as ethylene glycol) as a by-product. For example, the polyester polyol is not produced by replacing ethylene glycol with a sulfur-containing glycol in a polymer chain.

In the reaction system for forming the sulfur-containing polyester polyol, the sulfur-containing component is present in an amount from 1 wt % to 65 wt % (e.g., 3 wt % to 55 wt %, 5 wt % to 50 wt %, 7 wt % to 50 wt %, 10 wt % to 45 wt %, 15 wt % to 45 wt %, 15 wt % to 30 wt %, etc.) based on a total weight of the reaction system. For example, the sulfur-containing component may include from 0 wt % to 100 wt % (e.g., 25 wt % to 100 wt %, 50 wt % to 100 wt %, 90 wt % to 100 wt %, 95 wt % to 100 wt %, 98 wt % to 100 wt %, etc.) of the sulfur-containing polyol. The sulfur-containing component may include from 0 wt % to 100 wt % (e.g., 25 wt % to 100 wt %, 50 wt % to 100 wt %, 90 wt % to 100 wt %, 95 wt % to 100 wt %, 98 wt % to 100 wt %, etc.) of the sulfur-containing polycarboxylic acid.

The sulfur-containing polyol and/or polycarboxylic acid may include (e.g., may only include so as to consistent essentially of) sulfur, carbon, oxygen, and hydrogen atoms. The sulfur-containing polyol and/or polycarboxylic acid may be devoid of an oxygen atom bound directly to a sulfur atom. The sulfur-containing polyol may be a linear (i.e., non-branched) molecule. The sulfur-containing polyol and/or polycarboxylic acid may have a nominal hydroxyl functionality from 2 to 6 (e.g., by be a diol or triol). The sulfur-containing polyol and/or polycarboxylic acid may include one or more multi-functional polyols so as to be a mixture of sulfur-containing polyols and/or polycarboxylic acids. The sulfur-containing polyol may be a monomer or may be a previously formed relatively low molecular weight polyol prepared using a sulfur-containing monomer.

The sulfur-containing polyol and/or polycarboxylic acid has a number average molecular weight that is less than the number average molecular weight of the sulfur-containing polyester polyol. The sulfur-containing polyol and/or polycarboxylic acid may have a number average molecular weight from 50 g/mol to 3,000 g/mol (e.g., 50 g/mol to 2,500 g/mol, 75 g/mol to 2,000 g·mol, 100 g/mol to 2,000 g/mol, 100 g/mol to 1,500 g/mol, 110 g/mol to 1,250 g/mol, 110 g/mol to 1,000 g/mol, 110 g/mol to 750 g/mol, 120 g/mol to 500 g/mol, 120 g/mol to 300 g/mol, etc.). An exemplary sulfur-containing polyol is thiodiglycol (also referred to as 2,2-thiodiethanol), thioglycerol, 2,2'-thiodiethanol, 3,3-thiodipropanol, 3,6-dithia-1,8-octanediol, 3,5-dithia-1,7-heptanediol, 2-(ethylthio)ethanol, 2,2'-dithiodiethanol, bis(2-hydroxyethylthio) methane, 3-methylthio-1-propanamine, 2-(2-aminoethylthio)ethanol, 2-hydroxyethyl disulfide, or combinations thereof. An exemplary sulfur-containing polycarboxylic acid is 2,2'-thiodiacetic acid, 3,3'thiodipropionic acid, 2,2'-(ethylenedithio)diacetic acid, dithiodiglycolic acid, or combination thereof.

In the reaction system for forming the sulfur-containing polyester polyol, the at least one aromatic component is present in an amount from 1 wt % to 60 wt % (e.g., 10 wt % to 60 wt %, 15 wt % to 55 wt %, 20 wt % to 55 wt %, 30 wt % to 55 wt %, 40 wt % to 50 wt %, etc.) based on a total weight of the reaction system. The at least one aromatic component includes an aromatic multi-functional ester (such as a diester), an aromatic multi-functional carboxylic acid (such as a dicarboxylic acid), and/or an aromatic anhydride. The aromatic component may exclude sulfur.

The multi-functional ester may be an organic compound that includes two or more ester groups and at least one aromatic group (e.g., one aromatic group). The multi-functional ester may have a number average molecular weight that is from 100 g/mol to 500 g/mol (e.g., 150 g/mol to 400 g/mol, 190 g/mol to 300 g/mol, 190 g/mol to 250 g/mol, 190 g/mol to 210 g/mol, etc.) Exemplary multi-functional esters include dimethyl terephthalate, dimethyl isophthalate, diethyl terephthalate, and diethyl isophthalate.

The multi-functional carboxylic acid may be an organic compound that includes two or more carboxylic groups and at least one aromatic group (e.g., one aromatic group). The multi-functional ester may have a number average molecular weight that is from 100 g/mol to 500 g/mol (e.g., 125 g/mol to 400 g/mol, 150 g/mol to 300 g/mol, 150 g/mol to 250 g/mol, 155 g/mol to 185 g/mol, etc.) Exemplary multi-functional carboxylic acids include terephthalic acid, isophthalic acid, phthalic acid, and trimesic acid. Other carboxylic acids that may be used include succinic acid.

The aromatic anhydride may be an organic compound that includes at least one anhydride and at least one aromatic group (e.g., one aromatic group). The aromatic anhydride, may have a number average molecular weight that is from 100 g/mol to 500 g/mol (e.g., 125 g/mol to 400 g/mol, 125 g/mol to 300 g/mol, 130 g/mol to 200 g/mol, 135 g/mol to 155 g/mol, etc.) Exemplary aromatic anhydrides include phthalic anhydride. Other anhydrides that may be used in succinic anhydride and glutaric anhydride.

In the reaction system for forming the sulfur-containing polyester polyol, the at least one simple polyol is present in an amount from 0 wt % to 60 wt % (e.g., 1 wt % to 60 wt %, 3 wt % to 60 wt %, 5 wt % to 55 wt %, 5 wt % to 50 wt %, 5 wt % to 45 wt %, etc.) based on a total weight of the reaction system. With respect to the simple polyol, it is meant non-sulfur containing low number average molecular weight polyols (such as glycols). The simple polyol may be a monomer that has not been subjected to an alkylation process, such as a monomer that is known in the art for use as an initiator for an alkylation process. By low number average molecular weight it is meant a polyol having a molecular weight equal to or less than 800 g/mol, equal to or less than 700 g/mol, equal to or less than 600 g/mol, equal to or less than 500 g/mol, etc. The number average molecular weight may be greater than 40 g/mol. Exemplary, simple polyols include ethylene glycol, polyethylene glycol (such as diethylene glycol, triethylene glycol, and other polyethylene glycols), 1,2-propylene glycol, 1,3-propylene glycol, polypropylene glycol (such as dipropylene glycol, tripropylene glycol, and other polypropylene glycols) butanediol, hexanediol, glycerine, trimethylolpropane, pentaerythritol, dipentaerythritol, sorbitol, sucrose, and mixtures thereof.

The reaction mixture may include less than 5 wt % of the one or more polymerization catalysts (e.g., less than 1 wt %, less than 0.5 wt %, etc.)

According to exemplary embodiments, for the reaction system for forming the sulfur-containing polyester polyol, the at least one sulfur-containing polyol is present and includes at least thiodiglycol. For example, the amount of the thiodiglycol may be from 1 wt % to 60 wt %, 10 wt % to 60 wt %, 15 wt % to 55 wt %, 20 wt % to 55 wt %, 30 wt % to 55 wt %, 40 wt % to 50 wt %, etc. The reaction system may further include at least one aromatic component, having at least dimethyl terephthalate, dimethyl isophthalate, terephthalic acid, isophthalic acid, or phthalic anhydride. For example, the amount of dimethyl terephthalate, dimethyl isophthalate, terephthalic acid, isophthalic acid, or phthalic anhydride may be from 1 wt % to 60 wt % (e.g., 10 wt % to 60 wt %, 15 wt % to 55 wt %, 20 wt % to 55 wt %, 30 wt % to 55 wt %, 40 wt % to 50 wt %, etc.) The reaction system may further include the at least one simple polyol, having at least polyethylene glycol or glycerine. The amount of the polyethylene glycol or glycerine may be from 1 wt % to 60 wt % (e.g., 3 wt % to 60 wt %, 5 wt % to 55 wt %, 5 wt % to 50 wt %, 5 wt % to 45 wt %, etc.)

In exemplary embodiments, use of compounds that include the $SO_3^{2+}$ ion, may be minimized and/or avoided in the isocyanate-reactive component. In exemplary embodiments, the use of sulfinic based additives, such as sulfinic acids that are oxoacids of sulfur having the general structure R—SO(OH), where R is an organic alkyl or aryl group, may be minimized and/or avoided in the isocyanate-reactive component. In exemplary embodiments, the use of sulfonate based additives, such as sulfinate salts, may be minimized and/or avoided in the isocyanate-reactive component. In exemplary embodiments, the use of sulfonic based additives, such as sulfonic acids having the general structure R—S(=O)$_2$—OH, where R is an organic alkyl or aryl group and the S(=O)$_2$—OH group a sulfonyl hydroxide, may be minimized and/or avoided in the isocyanate-reactive component.

Polyol Component

In addition to the sulfur-containing polyester polyol, the polyol component may include one or more other polyols such as polyether polyols and/or polyester polyols. The polyol component, including the sulfur-containing polyester polyol, may be mixed before contacting the isocyanate component. The overall hydroxyl functionality in the isocyanate-reactive component may be adjusted by blending the sulfur-containing polyol with a polyol component that includes higher functionality polyols, such as polyols having a nominal hydroxyl functionality from 3 to 8.

Exemplary polyether polyols are the reaction product of alkylene oxides (such as at least one ethylene oxide, propylene oxide, butylene oxide, or combinations thereof) with initiators containing from 2 to 8 active hydrogen atoms per molecule. Exemplary initiators include ethylene glycol, diethylene glycol, 1,2-propylene glycol, 1,3-propylene glycol, dipropylene glycol, butane diol, glycerol, trimethylolpropane, triethanolamine, pentaerythritol, dipentaerythritol, sorbitol, ethylene diamine, toluene diamine, diaminodiphenylmethane, polymethylene polyphenylene polyamines, ethanolamine, diethanolamine, toluene diamine and mixtures of such initiators. The initiator used to form the other polyols may exclude sulfur. Exemplary polyols include VORANOL™ products, available from The Dow Chemical Company. The polyol component may include polyols that are useable to form rigid polyurethane foams.

The polyol component may include one or more other polyester polyols, such as non-sulfur containing polyester polyols. For example, polyester polyols known in the art for forming polyurethane polymers may be used. The isocyanate-reactive component may include polyols with fillers (filled polyols). The filled polyols may contain one or more copolymer polyols with polymer particles as a filler dispersed within the copolymer polyols. Exemplary filled polyols include styrene/acrylonitrile (SAN) based filled polyols, polyharnstoff dispersion (PHD) filled polyols, and polyisocyanate polyaddition products (PIPA) based filled polyols. In exemplary embodiments, polyol component may exclude any SANs-type polymer polyol. In this way a source of VOCs (such as residual styrene and acrylonitrile monomers) may be eliminated.

The isocyanate-reactive component may include a primary hydroxyl containing alcohol, such as a polybutadiene, a polytetramethylene ether glycol (PTMEG), a polyethylene glycol, a polypropylene glycol (PPG), a polyoxypropylene, and/or a polyoxyethylene-polyoxypropylene. In exemplary embodiments, the polyol component may include the sulfur-containing polyol, such as a sulfur-containing glycol, in place of another glycols (e.g., so as to minimize, reduce, and/or exclude the use of non-sulfur containing glycols) in the isocyanate-reactive component.

The polyol component may include one or more chain extenders and/or crosslinkers. Exemplary, chain extenders and crosslinkers include alkylene glycols (such as ethylene glycol, 1,2- or 1,3-propylene glycol, 1,4-butanediol, and 1,6-hexanediol), glycol ethers (such as diethylene glycol). Processing aids, chain extenders, or crosslinkers having sulfur moieties that may be used in the isocyanate-reactive component be 2,2'-thiodiethanol, thioglycerol, 2-(ethylthio) ethanol, 2,2'-dithiodiethanol, bis (2-hydroxyethylthio) methane, and 3-methylthio-1-propanamine.

The isocyanate-reactive component may include polyamines that are known in the art for use in forming polyurethane-polyurea polymers. In exemplary embodiments, the isocyanate-reactive component may include alkoxylates of ammonia or primary or secondary amine compounds, e.g., as aniline, toluene diamine, ethylene diamine, diethylene triamine, piperazine, and/or aminoethylpiperazine.

Additive Component

The additive component is separate from the components that form the preformed aqueous dispersion and the polyol component. The additive component is part of the isocyanate-reactive component, but other additives may be incorporated into the isocyanate component. The additive component may include a catalyst, a curing agent, a surfactant, a blowing agent, a polyamine, a plasticizer, a fragrance, a pigment/dye, a UV stabilizer, water, and/or a filler. Other exemplary additives include a chain extender, flame retardant, smoke suppressant, drying agent, a reinforcing agent, talc, powder, mold release agent, plasticizer, paraffin oil, plant or animal oil or fat, epoxidized vegetable oils and/or animal fats, wax particles, and other additives that are known in the art for use in rigid foams and rigid foam products.

The additive component may include tin catalyst, zinc catalyst, bismuth catalyst, metal carboxylate, and/or amine catalyst. The total amount of catalyst in the isocyanate-reactive component may be from 0.1 wt % to 5.0 wt %.

A surfactant may be included in the additive component, e.g., to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters, and alkyl arylsulfonic acids may be used. For example, the formulation may include a surfactant such as an organosilicone surfactant. The total amount of an organosilicone surfactant in the isocyanate-reactive component may be from 0.1 wt % to 5.0 wt %, 0.1 wt % to 3.0 wt %, 0.1 wt % to 2.0 wt %, and/or 0.1 wt % to 1.0 wt %.

The additive component may include water, which is separate from the preformed aqueous polymer dispersion. The water may account for less than 2.0 wt % of the total weight of isocyanate-reactive component. The total water, including water from the preformed aqueous polymer dispersion and water from the additive component, may account for less than 5 wt % of the total weight of isocyanate-reactive component.

Exemplary flame retardants may be solid or liquid. For example, non-halogenated flame retardants and/or one or more halogenated flame retardants may be used.

Isocyanate Component

The isocyanate component includes at least one isocyanate. The isocyanate component is present at an isocyanate index from 100 to 900 (e.g., from 100 to 700, from 100 to 700, from 100 to 600, from 100 to 500, from 150 to 450, from 200 to 400, and/or from 200 to 300). The isocyanate index is defined as the molar stoichiometric excess of isocyanate moieties in a reaction mixture with respect to the number of moles of isocyanate-reactive units (active hydrogens available for reaction with the isocyanate moiety), multiplied by 100. An isocyanate index of 100 means that there is no stoichiometric excess, such that there is 1.0 mole of isocyanate groups per 1.0 mole of isocyanate-reactive groups, multiplied by 100. For example, the polyurethane product prepared using the sulfur-containing polyester polyol may be a rigid polyurethane foam prepared at an isocyanate index equal to or greater than 120.

The isocyanate component may include one or more isocyanate such as polyisocyanate and/or isocyanate-terminated prepolymer. The isocyanate may be isocyanate-containing reactants that are aliphatic, cycloaliphatic, alicyclic, arylaliphatic, and/or aromatic polyisocyanates or derivatives thereof. Exemplary derivatives include allophanate, biuret, and NCO (isocyanate moiety) terminated prepolymer. For example, the isocyanate component may include at least one aromatic isocyanate, e.g., at least one aromatic polyisocyanate or at least one isocyanate-terminated prepolymer derived from an aromatic polyisocyanate. The isocyanate component may include at least one isomer of toluene diisocyanate (TDI), crude TDI, at least one isomer of diphenyl methylene diisocyanate (MDI), crude MDI, and/or higher functional methylene polyphenyl polyisocyanate. Examples include TDI in the form of its 2,4 and 2,6-isomers and mixtures thereof and MDI in the form of its 2,4'-, 2,2'- and 4,4'-isomers and mixtures thereof. The mixtures of MDI and oligomers thereof may be crude or polymeric MDI and/or a known variant of MDI comprising urethane, allophanate, urea, biuret, carbodiimide, uretonimine and/or isocyanurate groups. Exemplary isocyanates include VORANATE™ M 220 (a polymeric methylene diphenyl diisocyanate available from The Dow Chemical Company). Other exemplary polyisocyanate include tolylene diisocyanate (TDI), isophorone diisocyanate (IPDI) and xylene diisocyanates (XDI), and modifications thereof. In exemplary embodiments, the isocyanate component may only include one or more aromatic diisocyanates. For example, the isocyanate component may only include TDI and/or MDI.

Polyurethane Product

The polyurethane product may be useful in a variety of insulation applications, building applications, packaging applications, comfort applications (such as mattresses—including mattress toppers, pillows, furniture, seat cushions, etc.) shock absorber applications (such as bumper pads, sport and medical equipment, helmet liners, etc.), noise and/or vibration dampening applications (such as earplugs, automobile panels, etc.), apparel and filtration applications (such as vacuum air filters, gutter guards for protecting rain gutter/rain catcher against debris such as plant leaves and melting snow).

The polyurethane product may be a rigid polyurethane foam. For example, the polyurethane product may be a rigid polyurethane foam prepared at an isocyanate index that is equal to or greater than 100 (e.g., greater than 120, greater than 150, greater than 200, less than 500, etc.). For example, the polyurethane product may be a rigid polyurethane foam having a density from 0.5 pounds per cubic foot (pcf) to 5.0 pcf. For example, the polyurethane product may be a rigid polyurethane foam has a low k-factor, e.g., less than 22 mW/m*K. Whereas, the k-factor is a measure of the amount of heat that is transferred through the foam per unit area per unit time, taking into account the thickness of the foam and the applied temperature difference across the foam thickness. For example, the rigid polyurethane foam (also can be referred to as PUR/PIR foams) may be prepared by methods known in the art, such as in molding processes, pour-in-place processes, and spray-in-place processes.

For example, the rigid polyurethane foam may be used in composite elements (such as sandwich composite elements that include at least two outer layers of a rigid or flexible material and a core layer of a rigid polyurethane foam). Production of such composite elements may be made by processes known in the art. For example, after mixing of the components, the liquid reaction mixture of the isocyanate component and the isocyanate-reactive component may be injected into an empty preassembled panel, which is contained within a press/fixture.

The rigid polyurethane foam may be used in appliances, such as domestic and commercial refrigeration/freezer systems. For example, refrigerator and freezer cabinets may be insulated by partially assembling an exterior shell and interior liner, and holding them in position such that a cavity is formed between them. A foam forming formulation is introduced into the cavity, where it expands to fill the cavity.

Various other polyurethane products may be prepared using sulfur-containing polyester polyol. For example, the polyurethane product may be a polyurethane layer (such as an elastomer, coating, sealant, and/or adhesive), e.g., having a Shore 00 hardness of from 5 to 100, according to ASTM D-2240. The polyurethane product may be a polyurethane layer having, e.g., a Shore A hardness of from 5 to 100, according to ASTM D-2240. The polyurethane product may be a viscoelastic polyurethane foam, e.g., having a resiliency that is less than or equal to 20%, as measured according to ASTM D-3574. The polyurethane product may be a flexible polyurethane foam, e.g., having a resiliency that is greater than 20%, as measured according to ASTM D-3574.

The polyurethane product may be prepared at initial ambient conditions (i.e., room temperature ranging from 20° C. to 25° C. and standard atmospheric pressure of approximately 1 atm). Foaming at pressure below atmospheric condition can also be done, to reduce foam density and soften the foam. Foaming at pressure above atmospheric condition can be done, e.g., to increase foam density. In a molding processing, the viscoelastic polyurethane product may be prepared at initial mold temperature above ambient condition, e.g., 50° C. and above. Overpacking of mold, i.e. filling the mold with extra foaming material, can be done to increase foam density.

If necessary, heat may be applied to the reaction mixture for forming the polyurethane product to speed-up the curing reaction. For example, this may be done by heating some or all of the ingredients prior to combining them, by applying heat to the reaction mixture, or some combination of each. Curing may be continued until the reaction mixture has expanded and cured sufficiently to form a stable foam. In exemplary embodiments, the curing step may be performed in a closed mold. In such a process, the reaction mixture is either formed in the mold itself, or formed outside the mold and then injected into the mold, where it cures. The expansion of the reaction mixture as it cures is therefore constrained by the internal surfaces of the mold, as are the size and geometry of the molded part.

All parts and percentages are by weight unless otherwise indicated. All molecular weight data is based on number average molecular weight, unless indicated otherwise.

EXAMPLES

Approximate properties, characters, parameters, etc., are provided below with respect to various working examples, comparative examples, and the materials used in the working and comparative examples.

Synthesis of Sulfur-Containing Polyester Polyol

Working Example 1

The sulfur-containing polyester polyol according to Working Example 1 is prepared with a mixture that includes the following components:

TABLE 1

| Component | Molecular Weight | Moles Included | Weight Percent (based on total weight of mixture) |
|---|---|---|---|
| Thiodiglycol | 122 | 1.92 | 18.0 |
| Dimethyl terephthalate | 194 | 2.68 | 39.9 |
| PEG 200 | 200 | 2.28 | 34.8 |
| Glycerine | 92 | 1.04 | 7.3 |
| Diethylene glycol | 106 | — | — |
| Catalyst | 382 | <0.01 | <0.1 |
| Total | — | 7.92 | 100 |

PEG 200 is a polyethylene glycol having a number average molecular weight of approximately 200 g/mol (available from The Dow Chemical Company). The Catalyst is Tyzor® AA-105, which is an organic titanate catalyst available from DuPont™.

A 2 Liter 4-necked reactor is charged with the above components, except for the Catalyst. The reactor is equipped with a mechanical stirrer, a thermocouple connected to a temperature controller, a short path cold finger condenser to collect the methanol byproduct, a nitrogen inlet needle, and a gas outlet connected to an oil bubbler. A receiving flask is connected to the condenser, which is immersed in an ice bath to retain the methanol generated. The condenser is kept at a temperature of less than 5° C. using a chiller. Upon completing assembly, the reactor is heated to 160° C. and held there for two hours. During the heating cycle, when the reactor reaches a temperature of approximately 150° C., the Catalyst (approximately 0.07 grams) is added. After the heating cycle and two hours at 160° C., the reactor is further heated to 180° C. and held for two hours. Next, the reactor's temperature was increased to 200° C. and held there for three hours. Finally, the reaction mixture's temperature was increased to 210° C. and held at this temperature for five hours. Then, the mixture is cooled to ambient temperature and properties of the sample from the reactor are evaluated.

The sulfur-content in the composition for forming the polyol of Working Example 1 is 5.4 wt %. The amount of thiodiglycol in the resultant polyol is 24 mol %. Further, the resultant polyol has a hydroxyl number of 272 mg KOH/g, a number average molecular weight of 602 g/mol, an equivalent weight of 206 g/mol equivalence, and a viscosity of 8.86 Pa·s at 25° C.

For all of the Examples 1 to 5, the hydroxyl number is obtained by ASTM D4274. The number average molecular weight is measured using gel permeation chromatography (GPC) based on polystyrene standards, according to ASTM D5296. The equivalent weight is calculated from the hydroxyl number. The viscosity is measured on a rheometer at room temperature using a 40 mm cone geometry(2°) set to a gap of 54 μm and a constant shear rate of 10/s.

Working Example 2

The sulfur-containing polyester polyol according to Working Example 2 is prepared with a mixture that includes the following components as listed in Table 1 and a slightly modified process.

In particular, a 2 L 4-necked reactor is charged with the above components, except for the Catalyst. The reactor is equipped with the same assembly as for Working Example 1. Upon completing assembly, the reactor is heated to 180° C. over the course of one hour. During the heating cycle, when the reactor reaches a temperature of approximately 150° C., the Catalyst (approximately 0.3 grams) is added. After the heating cycle and three hours at 180° C., the reactor is further heated to 210° C. and held for three additional hours. Then, the mixture is cooled at ambient temperature. Next, the reactor is again heated to 210° C. and held for six additional hours. Then, the mixture is again cooled to ambient temperature and properties of the sample from the reactor are evaluated.

The sulfur-content in the composition for forming the polyol of Working Example 2 is 5.4 wt %. The amount of thiodiglycol in the resultant polyol is 24 mol %. Further, the resultant polyol has a hydroxyl number of 259 mg KOH/g, a number average molecular weight (GPC) of 640 g/mol, an equivalent weight of 217 g/mol equivalence, and a viscosity of 10.17 Pa·s at 25° C.

Working Example 3

The sulfur-containing polyester polyol according to Working Example 3 is prepared with a mixture that includes the following components:

TABLE 2

| Component | Moles Included | Weight Percent (based on total weight of mixture) |
| --- | --- | --- |
| Thiodiglycol | 0.57 | 23.0 |
| Dimethyl terephthalate | 0.64 | 41.3 |
| PEG 200 | 0.42 | 28.1 |
| Glycerine | 0.25 | 7.6 |
| Diethylene glycol | — | — |
| Catalyst | <0.01 | <0.1 |
| Total | 1.88 | 100 |

A 500 mL 4-necked reactor is charged with the above components, except for the Catalyst. The reactor is equipped with the same assembly as for Working Example 1. Upon completing assembly, the reactor is heated to 160° C. over the course of one hour. During the heating cycle, when the reactor reaches a temperature of approximately 150° C., the Catalyst (approximately 0.09 grams) is added. Then, the reactor temperature is increased to 180° C. and held for one hour. Next, the reactor temperature is increased to 200° C. and held for six and a half hours. Then, the reactor temperature is decreased to 150° C. and 200 mmHg vacuum is applied for 30 minutes. Next, the reactor is returned to atmospheric pressure and the temperature is increased to 200° C. and held there for three hours. Then, the mixture is again cooled to ambient temperature and properties of the sample from the reactor are evaluated.

The sulfur-content in the composition for forming the polyol of Working Example 3 is 7.0 wt %. The amount of thiodiglycol in the resultant polyol is 30 mol %. Further, the resultant sample has a hydroxyl number of 256 mg KOH/g, a number average molecular weight (GPC) of 657 g/mol, an equivalent weight of 219 g/mol equivalence, and a viscosity of 14.76 Pa·s at 25° C.

Working Example 4

The sulfur-containing polyester polyol according to Working Example 4 is prepared with a mixture that includes the following components:

TABLE 3

| Component | Moles Included | Weight Percent (based on total weight of mixture) |
| --- | --- | --- |
| Thiodiglycol | 1.13 | 45.9 |
| Dimethyl terephthalate | 0.71 | 45.7 |
| PEG 200 | — | — |
| Glycerine | 0.27 | 8.4 |
| Diethylene glycol | — | — |
| Catalyst | <0.01 | <0.1 |
| Total | 2.11 | 100 |

A 500 mL 4-necked reactor is charged with the above components, except for the Catalyst. The reactor is equipped with the same assembly as for Working Example 1. Upon completing assembly, the reactor is heated to 160° C. over the course of one hour. During the heating cycle, when the reactor reaches a temperature of approximately 150° C., the Catalyst (approximately 0.09 grams) is added. Then, the reactor temperature is increased to 180° C. and held for one hour. Next, the reactor temperature is increased to 200° C. and held for eleven hours, during which a notable increase in the rate of reaction was observed based on methanol generation. Then, the mixture is cooled to ambient temperature and properties of the sample from the reactor are evaluated.

The sulfur-content in the composition for forming the polyol of Working Example 4 is 14.2 wt %. The amount of thiodiglycol in the resultant polyol is 54 mol %. The resultant polyol has a hydroxyl number of 200 mg KOH/g, a number average molecular weight (GPC) of 975 g/mol, an equivalent weight of 281 g/mol equivalence, and a viscosity of 720 Pa·s at 25° C. While the viscosity is higher for Working Example 4, the resultant polyol is still a liquid and may be usable for preparing a polyurethane product.

Working Example 5

The sulfur-containing polyester polyol according to Working Example 5 is prepared with using a multi-functional carboxylic acid and the mixture includes the following components:

TABLE 4

| Component | Molecular Weight | Moles Included | Weight Percent (based on total weight of mixture) |
| --- | --- | --- | --- |
| Thiodipropionic Acid | 178 | 0.46 | 27.4 |
| Terephthalic Acid | 166 | 0.21 | 11.9 |
| PEG 200 | 200 | 0.55 | 36.6 |
| Glycerine | 92 | 0.25 | 7.7 |
| Diethylene glycol | 106 | 0.46 | 16.4 |
| Catalyst | 382 | <0.01 | <0.1 |
| Total | — | 1.93 | 100 |

A 500 mL 4-necked reactor is charged with the above components, except for the Catalyst. The reactor is equipped with the same assembly as for Working Example 1. Upon completing assembly, the reactor is heated to 160° C. over the course of one hour. During the heating cycle, when the reactor reaches a temperature of approximately 150° C., the Catalyst (approximately 0.09 grams) is added. Then, the reactor temperature is increased to 180° C. and held for four hours. Next, the reactor temperature is increased to 190° C. and held for two hours. Then, the reactor temperature is increased to 200° C. and held for two hours. Next, the reactor temperature is increased to 210° C. and held for three hours. Then, the reactor temperature is increased to 220° C. and held for two hours. Finally, the mixture is cooled to ambient temperature and properties of the sample from the reactor are evaluated.

The sulfur-content in the composition for forming the polyol of Working Example 5 is 5.4 wt %. The amount of the thiodipropionic acid in the resultant polyol is 24 mol %. Further, the resultant polyol has a hydroxyl number of 252 mg KOH/g, an acid number of 3.6 mg KOH/g, a number average molecular weight (GPC) of 635 g/mol, an equivalent weight of 223 g/mol equivalence, and a viscosity of 1.96 Pa·s at 25° C.

Referring to Working Examples 1 to 4 above, it is shown that even at high amounts of sulfur content (wt %) and high amounts of incorporated thiodiglycol (mol %) the resultant polyol is a liquid at room temperature and is of utility for preparing polyurethane products. In this regard, aromatic polyester polyols that have a viscosity that is sufficiently low to allow ease of pumping and mixing (e.g., without the use of solvents or other viscosity modifying additives) are sought for use in polyurethane products such as rigid foams, coatings, adhesives, elastomers, and sealants. In particular, an aromatic polyester polyol too high of a viscosity can cause difficulties in transfer of the material (e.g., from storage to reactor or from the final product to the final application of the product). Excessive viscosity can also be an obstacle to efficient mixing with other components such as the isocyanate component.

Polyurethane Products

Polyurethane formulations and product samples are prepared as discussed below:

| | |
| --- | --- |
| Polyol 1 | An aromatic polyester polyol that is the sulfur-containing polyol prepared in Working Example 1. |
| Polyol 2 | An aromatic polyester polyol that is the sulfur-containing polyol prepared in Working Example 2. |
| Polyol 3 | An aromatic polyester polyol, having a hydroxyl number from 300-330 mg KOH/g (available as VORANOL ™ 315 Low Smoke Polyol from The Dow Chemical Company). |
| Isocyanate | A polymeric methylene diphenyl diisocyanate product (available as PAPI ™ 580N from The Dow Chemical Company). |
| Surfactant | An organosilicone surfactant (available as TEGOSTAB ® B 8443 from Evonik). |
| Catalyst 2 | A trimerization catalyst (available as Polycat ® 46 from Air Products). |
| Catalyst 3 | An amine catalyst (available as Polycat ® 5 from Air Products). |
| FR | Triethyl phosphate (available from Sigma-Aldrich). |
| BA | Cyclopentane, a blowing agent. |

Working Examples 6 to 8, and Comparative Examples A to F are prepared according to the approximate formulations in Table 5, below. For each of Working Examples 6 to 8 and Comparative Examples A to F foam samples are prepared in a heated closed mold. And prepared according to a standardized hand-mix procedure.

TABLE 5

| | Ex. 6 | Ex. 7 | Ex. 8 | Ex. A | Ex. B | Ex. C | Ex. D | Ex. E | Ex. F |
| --- | --- | --- | --- | --- | --- | --- | --- | --- | --- |
| Isocyanate-Reactive Component (amount based on parts by weight) | | | | | | | | | |
| Polyol 1 | 85.0 | — | — | — | — | — | — | — | — |
| Polyol 2 | — | 85.0 | 85.0 | — | — | — | — | — | — |
| Polyol 3 | — | — | — | 85.0 | 58.0 | 58.0 | 85.0 | 58.0 | 63.0 |
| Thiodiglycol | — | — | — | — | 27.0 | — | — | 27.0 | — |
| Diethylene glycol | — | — | — | — | — | 27.0 | — | — | 22.0 |

TABLE 5-continued

|  | Ex. 6 | Ex. 7 | Ex. 8 | Ex. A | Ex. B | Ex. C | Ex. D | Ex. E | Ex. F |
|---|---|---|---|---|---|---|---|---|---|
| Water | 0.8 | 0.8 | 0.8 | 0.8 | 0.8 | 0.8 | 0.8 | 0.8 | 0.8 |
| Surfactant | 3.0 | 3.0 | 3.0 | 3.0 | 3.0 | 3.0 | 3.0 | 3.0 | 3.0 |
| Catalyst 2 | 1.9 | 1.9 | 1.7 | 1.9 | 1.9 | 1.9 | 1.9 | 2.6 | 2.6 |
| Catalyst 3 | 1.0 | 1.0 | 0.9 | 1.0 | 1.0 | 1.0 | 1.0 | 1.4 | 1.4 |
| FR | 15.0 | 15.0 | 16.5 | 15.0 | 15.0 | 15.0 | 18.7 | 26 | 26 |
| BA | 17.0 | 16.5 | 16.5 | 18.5 | 26.0 | 27.0 | 19 | 27.5 | 27.5 |
| Isocyanate Component (amount based on parts by weight) | | | | | | | | | |
| Isocyanate | 237 | 227 | 227 | 267 | 404 | 436 | 267 | 404 | 404 |
| Composition Properties | | | | | | | | | |
| Total Parts by Weight | 360.7 | 350.2 | 351.4 | 392.2 | 536.7 | 569.7 | 396.5 | 550.3 | 550.5 |
| Isocyanate Index | 343 | 343 | 343 | 343 | 343 | 343 | 343 | 343 | 343 |
| Calculated Sulfur Amount (wt % in composition) | 1.3 | 1.3 | 1.3 | 0 | 1.3 | 0 | 0 | 1.3 | 0 |
| Foam Properties | | | | | | | | | |
| K-factor (mW/m * K) | — | 21.0 | — | 20.8 | 21.8 | 20.8 | — | — | — |
| Rigid Compression (psi) | — | 36.1 | — | 24.0 | 41.1 | 29.4 | — | — | — |
| Open Cell Content (%) | — | 3.9 | — | 3.9 | 3.8 | 4.0 | — | — | — |
| Density (pcf) | — | 2.70 | — | 2.55 | 3.02 | 2.43 | — | — | — |
| **Cone calorimetry | | | | | | | | | |
| Flux Level (kW/m$^2$) | 50 | 50 | 50 | 50 | 50 | 50 | 50 | 50 | 50 |
| Mass loss (%) | 55 | 58 | 47 | 75 | 59 | 65 | 53 | 58 | 59 |
| Fuel Load (MJ/m$^2$) | 11.3 | 11.9 | 10.3 | 16.8 | 13.3 | 14.6 | 11.6 | 13.0 | 13.2 |
| Total Heat Release (MJ/m$^2$) | 15.4 | 15.8 | 11.8 | 22.6 | 19.5 | 21.0 | 13.8 | 15.9 | 16.2 |
| Total Smoke Release (m$^2$/m$^2$) | 252 | 212 | 160 | 348 | 314 | 360 | 204 | 258 | 343 |
| Total Smoke Production (m$^2$) | 2.2 | 1.8 | 1.4 | 3.1 | 2.8 | 3.2 | 1.8 | 2.3 | 3.1 |
| Peak HRR (kW/m$^2$) | 166 | 140 | 151 | 174 | 153 | 148 | 145 | 148 | 153 |

Firstly, the respective isocyanate-reactive components are prepared in the absence of blowing agent BA. In particular, the isocyanate-reactive components according to the Table 5 are prepared by adding Catalyst 2, Catalyst 3, and Surfactant to a 500 mL plastic bottle that includes the respective aromatic polyester polyol and optionally the thiodiglycol and/or diethylene glycol, according to the example being prepared. Then, the mixture is thoroughly mixed until the contents are visually inspected to ensure that the resulting mixture does not exhibit heterogeneity. Then, the FR component is added to the bottle, followed by additional vigorous shaking of the bottle to afford a homogeneous mixture. Next, water is added to the bottle, followed by mixing of the bottle's contents for approximately one minute.

Secondly, foam samples are prepared by adding the required amount of the respective isocyanate-reactive component prepared above to a 1 L tripour cup. Then, the appropriate quantity of BA are added to the cup, followed by blending the mixture using an overhead mixer for approximately 60 seconds. Next, the appropriate portion of Isocyanate is added to the cup, which is then immediately stirred using a mixer set to 2470 rpm for a period of 5 seconds. The resulting mixture is poured into a mold, which is pre-heated to 120° F. The lid to the mold is closed and the resulting polyurethane foam sample remained inside of the mold at 120° F. until surfaces were found to be tack-free (approximately 15 min for most samples), after which the foam product is gently demolded and the properties thereof are measured.

Referring to Working Examples 6 to 8, foam properties are not compromised by using the sulfur-containing aromatic polyester polyol in comparison to a commercial aromatic polyester polyol. Further, it is shown that by using the sulfur-containing polyester polyol significantly improved performance with respect to cone calorimetry (used to measure fire behavior). Also, it is shown that by using a sulfur-containing polyester polyol, in comparison to merely adding a sulfur containing monomer to an isocyanate reactive component or a chain extender such as diethylene glycol to a formulated isocyanate-reactive component, performance with respect to fire behavior (as measured by using cone calorimetry) is surprisingly found to be improved. In particular, the cone calorimetry data confirms that smoke generation is reduced for rigid foams that comprise the sulfur-containing polyester polyol (i.e., the thioether-functionalized polyester polyol used in Working Examples 6 to 8). Also, mass loss is less significant for the sulfur-containing polyester polyols, which correlates with the observed lower smoke generation measured.

Referring to Table 5, K-factor is measured according to ASTM C 518-04. Rigid compression is measured according to ASTM D 1621-04. Open cell content is measured according to ASTM D 2856. Density (pcf) is measured according to ASTM D 1622. Cone calorimetry and the corresponding data for the resultant rigid polyurethane foam are measured according to ASTM E 1354-16.

The invention claimed is:

1. A reaction system for forming a step-growth polymerized sulfur-containing polyester polyol, the reaction system comprising:
   at least one sulfur-containing component selected from the group of a sulfur-containing polyol and a sulfur-containing polycarboxylic acid, an amount of the at least one sulfur-containing component being from 1 wt % to 65 wt %, based on a total weight of the reaction system;
   at least one aromatic component selected from the group of an aromatic multi-functional ester, an aromatic multi-functional carboxylic acid, and an aromatic anhydride, an amount of the at least one aromatic component being from 1 wt % to 60 wt %, based on the total weight of the reaction system;
   at least one simple polyol that excludes sulfur and is different from the sulfur-containing polyol, an amount of the at least one simple polyol being from 0 wt % to 60 wt %, based on a total weight of the reaction system; and
   at least one polymerization catalyst, and
   an isocyanate component;
   wherein, the reaction system for forming the sulfur-containing polyester polyol having a sulfur content that is from 0.1 wt % to 1.3 wt %, based on a total weight of the reaction system.

2. The reaction system as claimed in claim 1, wherein the at least one sulfur-containing polyol is present in an amount from 10 wt % to 60 wt % and the amount of the at least one simple polyol is from 5 wt % to 50 wt %, based on a total weight of the reaction system.

3. The reaction system as claimed in claim 1, wherein the at least one sulfur-containing polyol is present and has a nominal hydroxyl functionality from 2 to 6 and a number average molecular weight from 50 g/mol to 3,000 g/mol.

4. The reaction system as claimed in claim 1, wherein the at least one sulfur-containing polyol is present and includes thiodiglycol, thioglycerol, 2,2'-thiodiethanol, 3,3-thiodipropanol, 3,6-dithia-1,8-octanediol, 3,5-dithia-1,7-heptanediol, 2-(ethylthio)ethanol, 2,2'-dithiodiethanol, bis(2-hydroxyethylthio) methane, 3-methylthio-1-propanamine, 2-(2-aminoethylthio)ethanol, 2-hydroxyethyl disulfide, or combinations thereof.

5. The reaction system as claimed in claim 1, wherein:
   the at least one sulfur-containing component includes at least thiodiglycol,
   the at least one aromatic component includes at least dimethyl terephthalate, dimethyl isophthalate, terephthalic acid, isophthalic acid, or phthalic anhydride, and
   the at least one simple polyol includes at least polyethylene glycol or glycerine, the amount of the at least one simple polyol being from 3 wt % to 60 wt %.

6. The reaction system as claimed in claim 1, wherein the at least one sulfur-containing component includes from 10 wt % to 60 wt % of thiodiglycol, based on a total weight of the reaction system.

7. The reaction system as claimed in claim 1, wherein growth of a polymer chain for forming the step-growth polymerized sulfur-containing polyester polyol occurs in the middle of the polymer chain and optionally at one or both terminal ends of the polymer chain.

8. The reaction system as claimed in claim 1, wherein the reaction system forms a rigid polyurethane foam having an isocyanate index that is greater than or equal to 300.

9. The step-growth polymerized sulfur-containing polyester polyol prepared according to the reaction system as claimed in claim 1, wherein the sulfur-containing polyester polyol has a sulfur content that is from 2 wt % to 20 wt %.

* * * * *